Patented Mar. 5, 1946

2,396,066

UNITED STATES PATENT OFFICE 2,396,066

PREPARATION OF 2-CHLOROPYRAZINE

Philip S. Winnek, Indianapolis, Ind., assignor to American Cyanamid Company, New York, N. Y., a corporation of Maine No Drawing. Application August 25, 1943, Serial No. 499,993

8 Claims. (Cl. 260—250)

The present invention relates to a new chemical compound, mono-chloropyrazine, and a method for its preparation. More particularly, it relates to the preparation of mono-chloropyrazine by reacting pyrazine with chlorine in the vapor phase.

The compound, mono-chloropyrazine, is useful as an intermediate in the preparation of 2-aminopyrazine, which process is claimed in the copending application Serial No. 499,994, filed August 25, 1943. The mono-chloropyrazine is also useful as an intermediate in the preparation of the therapeutically active sulfonamide, 2-sulfanilamidopyrazine.

It has been known in the past that benzene can be halogenated with chlorine or bromine comparatively easily at room temperature. It has also been known that pyridine, a heterocyclic liquid compound, can be chlorinated or brominated in the vapor phase at relatively high temperatures in the presence of a catalyst to give mixtures of mono-, di-, and tri-halogenated pyridines. Pyrazine, on the other hand, cannot be successfully chlorinated or brominated by treatment with halogens at ordinary temperatures. In actual experiments it was found that chlorine reacted with solid pyrazine at room temperature to give very largely carbonaceous materials, indicating that the chlorine has a destructive action upon pyrazine and that no chlorination took place. Similarly, in experiments wherein chlorine was passed through molten pyrazine, only decomposition products were obtained.

In accordance with the present invention it has been discovered that mono-chloropyrazine can be produced in good yields by reacting chlorine in the vapor phase with pyrazine, also in the vapor phase, at temperatures between 150 and 600° C. When a catalyst is employed, the reaction readily takes place at the lower temperatures. When no catalyst is employed, the reaction takes place within the temperature range of from about 450 to 600° C. It is indeed surprising that mono-chloropyrazine is obtained by the vapor-phase chlorination process described above. Theoretically, pyrazine could combine with chlorine to give a mono-, di-, tri-, or a tetra-chlorine-substituted pyrazine. It has been seen that in the case of pyridine, mixtures of mono-, di-, and trisubstituted chlorinated products are obtained. It is an unexpected phenomenon, therefore, that in the case of pyrazine, the principal product obtained by reacting chlorine with pyrazine in the vapor phase is mono-chloropyrazine. In the case of pyridine, the reaction occurs either with chlorine or with bromine. In the case of pyrazine no mono-brominated product was obtained when bromine vapors were brought in contact with pyrazine vapors, whereas excellent yields of mono-chloropyrazine were obtained with chlorine vapors.

In view of the foregoing it is evident that the process of the present invention is one that gives an unexpectedly new and surprisingly different result.

As pointed out heretofore, the chlorination of pyrazine proceeds very satisfactorily when chlorine and pyrazine are reacted in the vapor phase at a temperature of between 150 and 600° C., both gases having been preheated before coming in contact with each other. To obtain best results in my vapor-phase reactions it may be desirable to use an excess of one of the reactants or a gas not itself entering into the reaction, but mixed with one or both reactants. For the latter purpose nitrogen was found expedient but not necessary for carrying out the invention.

It was found advantageous to preheat the pyrazine and chlorine with or without the nitrogen before allowing them to come together in the reaction space; otherwise, separation of carbon and other undesirable reactions took place. The reaction of chlorine and pyrazine is an exothermic reaction, causing a narrow section on the reacting tube to be much hotter than the tube in general and is referred to in the examples as the hot-spot. When the reaction space contained catalysts, such as activated carbon or copper chloride on diatomaceous earth, in pellet form, the reaction took place at a temperature of from about 200 to about 450° C., with yields of from 23 to 44 per cent. When the temperature of the reaction space was raised to about 600° C., no catalyst was necessary, and yields of 46 per cent were obtained. The 2-chloropyrazine can be extracted by the addition of water and sodium hydroxide and purified by steam distillation.

The present invention will be described in greater detail in conjunction with the following specific examples, which are merely illustrative of the preferred methods and conditions and are not intended to limit the scope of the invention.

Example 1

82 g. of molten pyrazine were vaporized at 250 to 330° C. in a stream of nitrogen. Into this stream were flowed about 70 g. of chlorine, preheated to 150 to 250° C. The mixed vapors passed immediately through the catalyst section of the apparatus, containing activated carbon heated to about 200° C. (contact time, about five seconds).

Thereupon, a reaction hot-spot of 250 to 288° C. was maintained. Operation was continued for 100 minutes, pyrazine being fed in at the rate of 0.8 cc. per minute. From a solid product of 92 g., containing also unconverted pyrazine and hydrogen chloride, 16 g. of oil separated upon addition of water. The aqueous layer was made basic and distilled with the oil added. The two-phase distillates were basified, 55 g. of oil separating from the first part; the second part was extracted with benzene. Distillation of the combined oils gave a fraction B. P. 150 to 153° C., which on analysis proved to be 2-chloropyrazine—yield, 35%.

Example 2

36 g. of molten pyrazine were vaporized during 38 minutes at the rate of 0.9 cc. per minute in a stream of nitrogen at 220° C. The resulting vapors were mixed with a stream of chlorine (0.63 mol) and nitrogen at 240° C. and immediately passed to the catalyst, consisting of 163 cc. of 20% copper chloride on diatomaceous earth (contact time, about 2½ seconds). The tube was heated to 340° C., giving a reaction hot-spot of 390 to 430° C. The solid product on purification yielded 11.5 g. of 2-chloropyrazine—yield, 44%.

The apparatus employed in Examples 1 and 2 comprised separate heating means for vaporizing the reactants and a heated reaction tube containing the catalyst through which the mixed vapors were passed.

Example 3

At the rate of 0.9 cc. per minute, 28 g. of molten pyrazine were vaporized at 280° C. in a stream of nitrogen. With this a mixture of chlorine (0.30 mol) and nitrogen preheated to 295° C. was mixed within a small, empty glass tube heated to about 500° C. (contact time, 0.2 second). The temperature of the tube hot-spot was 510 to 585° C. The reaction lasted one-half hour, after which 11.5 g. of 2-chloropyrazine were obtained—yield, 46%.

While in the above examples the catalysts used were activated carbon and copper chloride, other catalysts may be used, such as quartz chips and Alundum; or, as noted, at higher temperatures, such as 450 to 600° C. good yields can be obtained without the use of a catalyst.

In the examples given above nitrogen was used as a diluent for one or both reactants. The use of a gas as a diluent is not necessary but is preferable in the carrying out of the invention. In the event that a gas, inert to the reactants other than nitrogen, is desired, the rare gases, such as argon, helium, or neon, may prove satisfactory.

The above description and examples are intended to be illustrative only. Any modification of or variation therefrom which conforms to the spirit of the invention is intended to be included in the scope of the claims.

What I claim is:

1. The compound 2-chloropyrazine.
2. A process for the manufacture of mono-chloropyrazine which comprises mixing the vapors of chlorine and pyrazine at a temperature within the range of from about 150° to 600° C. whereupon said vapors react to form mono-chloropyrazine.
3. A process for the manufacture of mono-chloropyrazine which comprises heating chlorine vapor to a temperature of at least 150° C., independently heating pyrazine to vaporize the same, mixing the said vapors of chlorine and pyrazine at a temperature within the range 150° to 600° C. and recovering the mono-chloropyrazine formed as the result of the reaction of said vapors.
4. A method for the manufacture of mono-chloropyrazine which comprises mixing with heated vapors of pyrazine a heated mixture of chlorine gas and an inert diluent gas, said mixing being made with the said reactants at a temperature within the range of about 150° to 600° C. and recovering therefrom mono-chloropyrazine resulting from the reaction of said chlorine and pyrazine.
5. A method for the manufacture of mono-chloropyrazine which comprises diluting with nitrogen heated vapors of pyrazine and chlorine gas, mixing said diluted pyrazine and chlorine at a temperature within the range 150° to 600° C. whereupon the pyrazine and chlorine react to form mono-chloropyrazine which is then recovered.
6. A process for the manufacture of mono-chloropyrazine which comprises mixing pre-heated chlorine and pre-heated pyrazine in vapor phase at a temperature from about 150° to 450° C. in the presence of a chlorination catalyst.
7. A process for the manufacture of mono-chloropyrazine which comprises mixing pre-heated chlorine and pre-heated pyrazine in vapor phase at a temperature from about 150° to 450° C. in the presence of a contact material impregnated with copper chloride.
8. A process for the manufacture of mono-chloropyrazine which comprises mixing pre-heated chlorine and pre-heated pyrazine in vapor phase at a temperature from about 150° to 450° C. in the presence of activated carbon.

PHILIP S. WINNEK.